(12) United States Patent
Shimizu et al.

(10) Patent No.: US 8,031,987 B2
(45) Date of Patent: Oct. 4, 2011

(54) OPTICAL MODULATOR

(75) Inventors: Ryo Shimizu, Chiyoda-ku (JP);
Takahisa Fujita, Chiyoda-ku (JP); Toru Sugamata, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 12/924,758

(22) Filed: Oct. 5, 2010

(65) Prior Publication Data
US 2011/0026868 A1 Feb. 3, 2011

Related U.S. Application Data

(62) Division of application No. 12/085,115, filed on Jan. 9, 2009.

(30) Foreign Application Priority Data

Nov. 16, 2005 (JP) ................................. 2005-331954

(51) Int. Cl.
*G02F 1/035* (2006.01)
(52) U.S. Cl. ........................................................ 385/2
(58) Field of Classification Search .................... 385/2
See application file for complete search history.

(56) References Cited

U.S. PATENT DOCUMENTS

| | | | |
|---|---|---|---|
| 5,042,895 A * | 8/1991 | Chouinard et al. ............... | 385/2 |
| 6,038,354 A | 3/2000 | Sato et al. | |
| 6,741,379 B2 | 5/2004 | Kaitoh et al. | |
| 6,867,901 B2 * | 3/2005 | Sugiyama et al. ............ | 359/322 |
| 7,027,674 B2 | 4/2006 | Matsushima et al. | |
| 2002/0151113 A1 * | 10/2002 | Hung et al. .................... | 438/127 |
| 2009/0252500 A1 | 10/2009 | Shimizu et al. | |

FOREIGN PATENT DOCUMENTS

| | | | |
|---|---|---|---|
| JP | 6-308437 A | | 11/1994 |
| JP | 06308437 A | * | 11/1994 |
| JP | 8-288701 A | | 11/1996 |
| JP | 2003-233043 A | | 8/2003 |
| JP | 2004-093606 A | | 3/2004 |

OTHER PUBLICATIONS

Gopalakrishnan, G.K., et al., Electrical Loss Mechanisms in Travelling Wave LiNbO3 Optical , Electronics Letters, vol. 28, No. 2, 1992, pp. 207-209.

* cited by examiner

*Primary Examiner* — Uyen Chau N Le
*Assistant Examiner* — Chris Chu
(74) *Attorney, Agent, or Firm* — Chapman and Cutler LLP

(57) ABSTRACT

An optical modulator suppresses a radiation mode of a microwave generated in a connection substrate or termination substrate from entering a signal electrode of the optical modulator and suppresses modulation properties from being degraded. The optical modulator includes an optical modulation element (1) having a substrate with an electro-optic effect, an optical waveguide formed on the substrate, and a modulating electrode (or a signal electrode (2)) for modulating light passing through the optical waveguide; and a connection substrate (4), arranged outside the substrate, for supplying the optical modulation element with a microwave signal operating the optical modulation element. A signal input terminal (22) and a signal output terminal (23) are formed on the connection substrate (20). A recombination suppression unit suppresses a radiation mode (24) of the microwave signal input to the signal input terminal (22) from being recombined with the signal output terminal (23) provided on the connection substrate.

4 Claims, 5 Drawing Sheets

[Fig. 1]    PRIOR ART
(a)
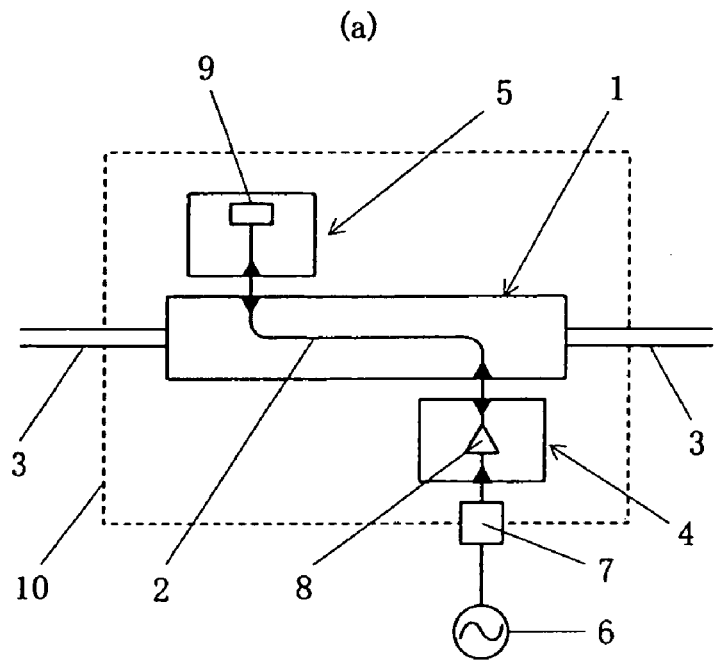
(b)
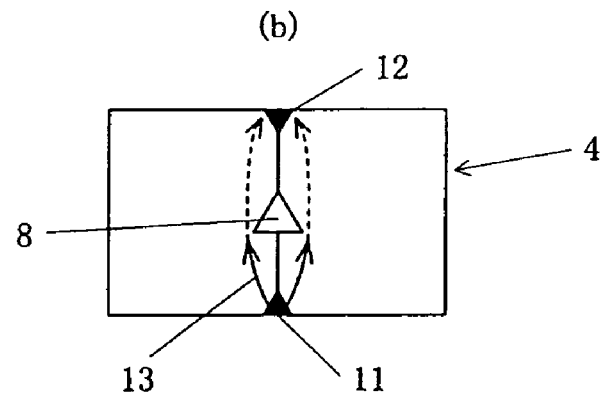
(c)
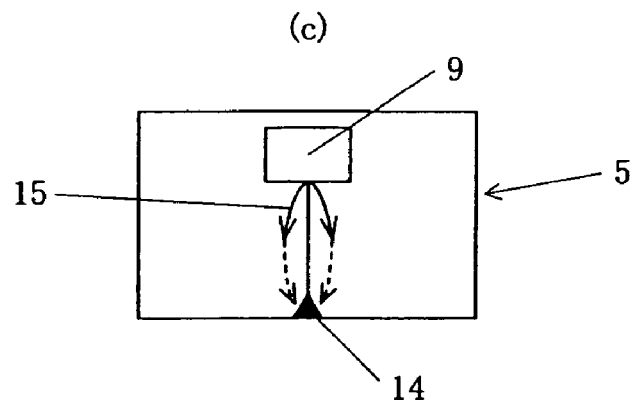

[Fig. 2]
(a)
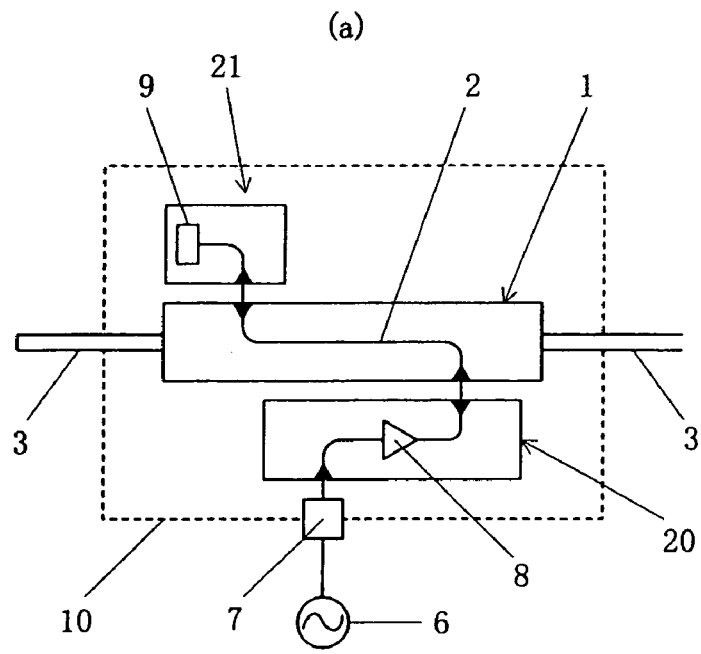
(b)
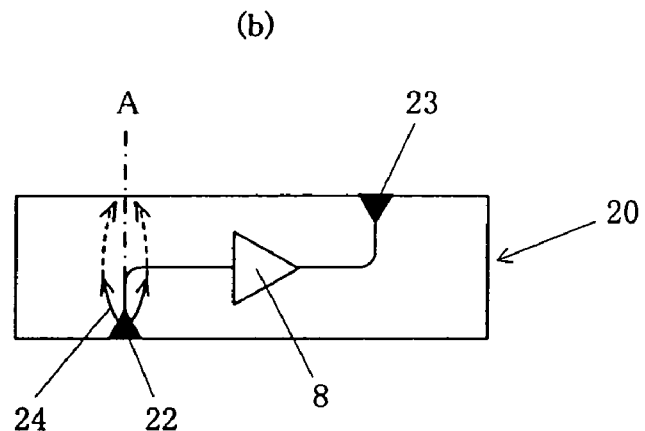
(c)
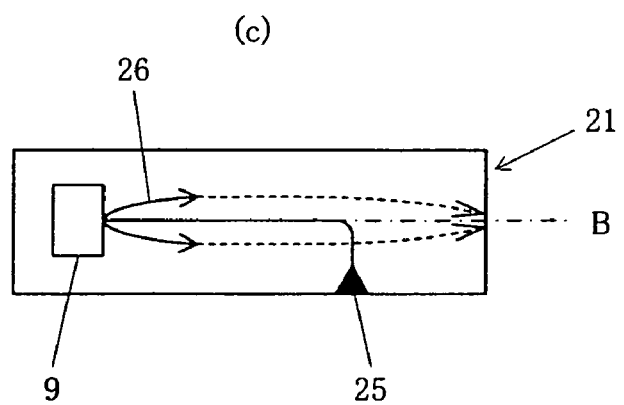

[Fig. 3]
(a)
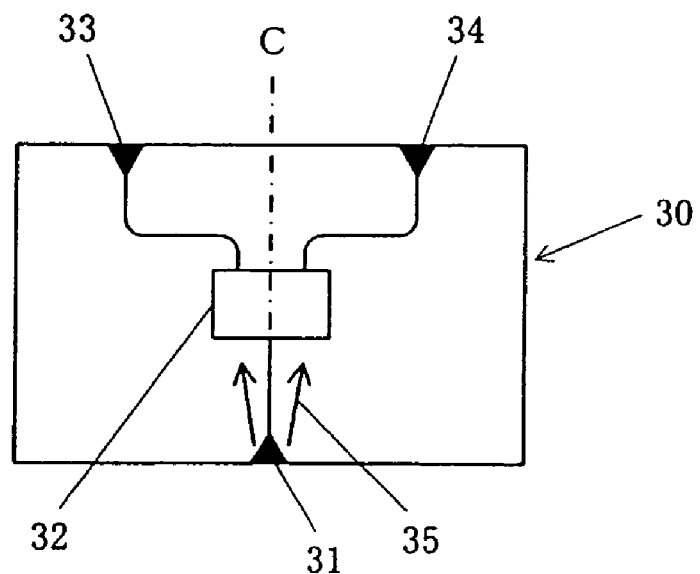
(b)
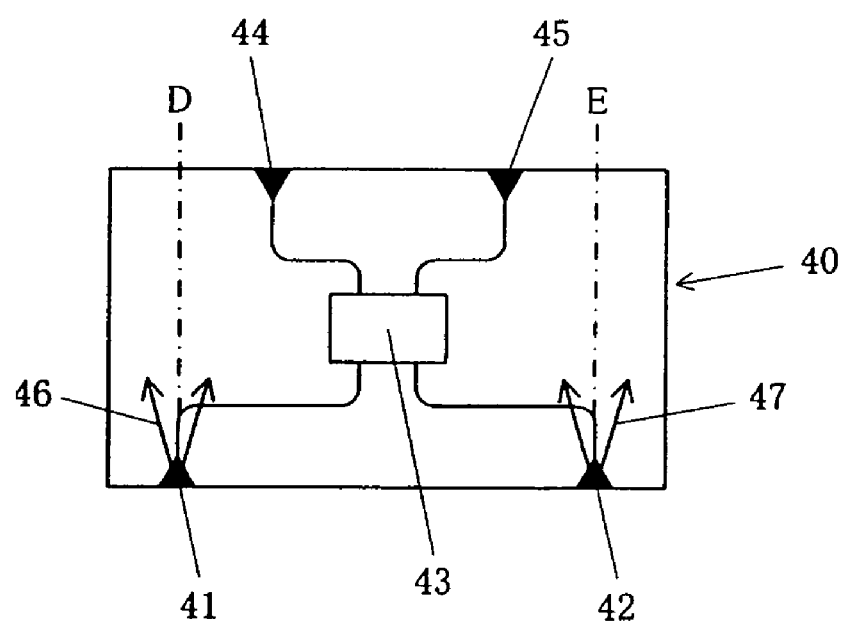

[Fig. 4]
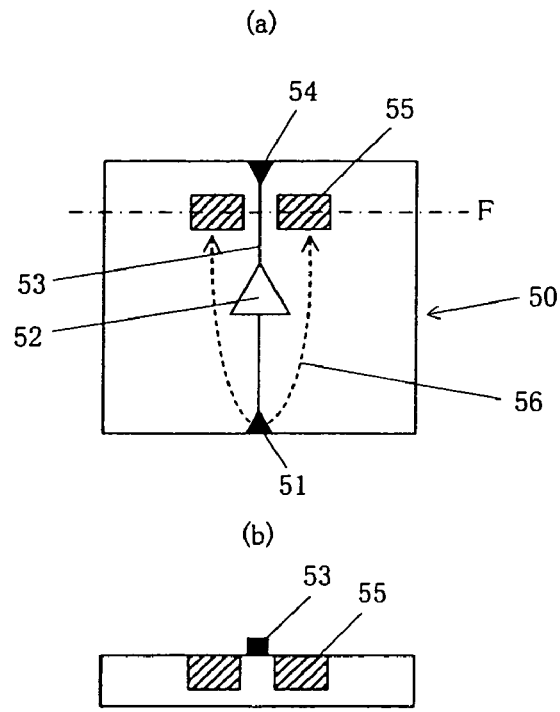
[Fig. 5]
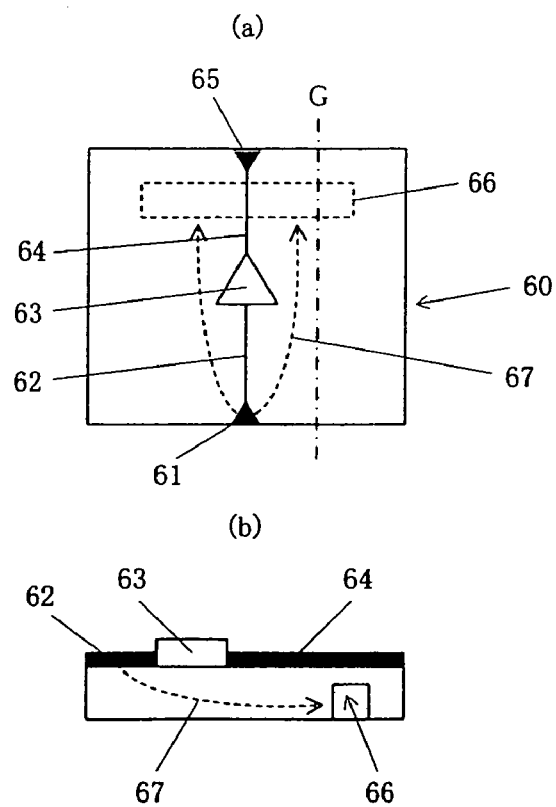

[Fig. 6]
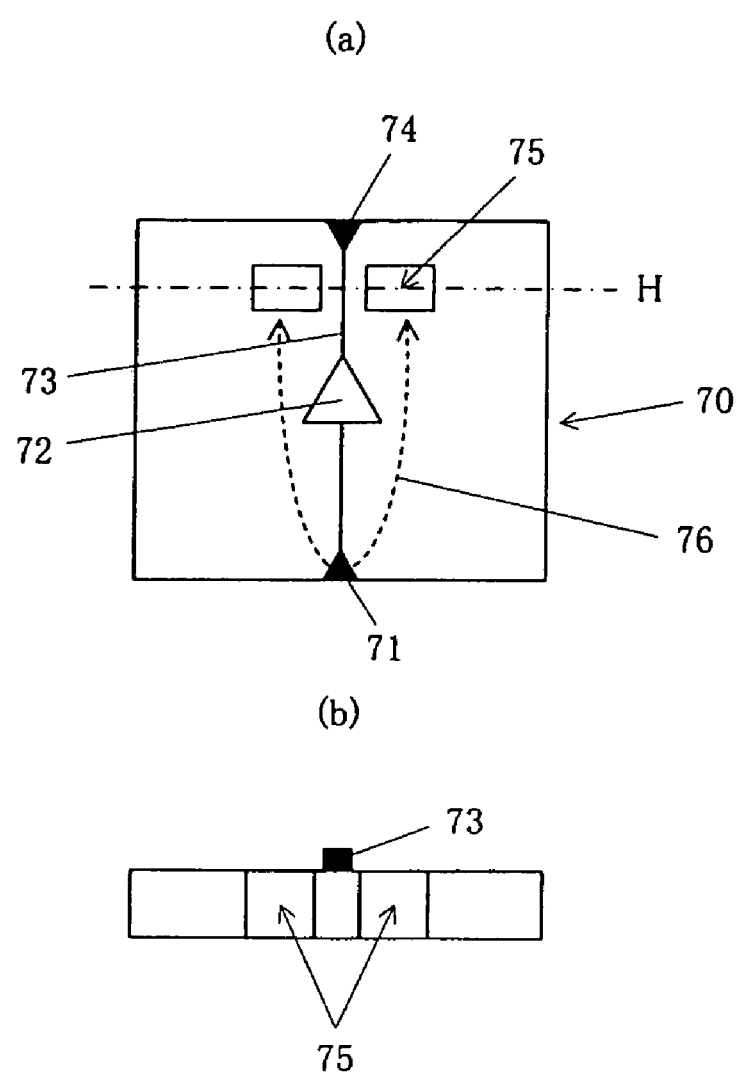

OPTICAL MODULATOR

This application is a division of U.S. patent application Ser. No. 12/085,115, filed May 16, 2008 (with a §371(c) date of Jan. 9, 2009), which was the U.S. national phase of PCT/JP2006/322533 filed Nov. 13, 2006, and claims priority of Japan Pat. App. No. 2005-331954 filed Nov. 16, 2005, the contents of all of which are incorporated herein by reference. The present invention relates to an optical modulator, and more particularly, to an optical modulator having a connection substrate arranged outside an optical modulation element or a termination substrate.

TECHNICAL FIELD

Background Art

In general, waveguide type optical modulators in which an optical waveguide or a modulating electrode is formed onto a substrate having an electro-optic effect are widely used in optical communication fields or optical measurement fields. At the request of improvement of high-speed, high-capacity communication or optical measurement precision in this optical modulator, the development of an optical modulator stably operable even in a high-frequency band is required. Recently, optical modulators of more than several tens GHz have also been implemented.

When the optical modulator operates in the high-frequency band, a jitter value of an eye pattern is apt to be large in an optical output waveform from the optical modulator. There occurs the degradation of modulation properties including the degradation of waveform quality of an optical output signal or the reduction of an optical transmission distance.

In a result of keen research by the inventors, it has been found that noise included in a microwave signal operating the optical modulator is one of factors causing the jitter value to be large as described below.

An example of the optical modulator is shown in FIG. 1. An optical modulation element 1 of FIG. 1(a) is formed with an optical waveguide (not shown), a modulating electrode, and the like on a substrate having the electro-optic effect such as LiNbO$_3$. The modulating electrode is constructed with a signal electrode 2, a ground electrode (not shown), and the like. The optical modulation element 1 is connected to an optical fiber 3 for receiving and emitting an optical wave.

A connection substrate 4 having an amplifier 8 and the like and a termination substrate 5 having a termination device 9 and the like are arranged around the optical modulation element 1. Along with the optical modulation element 1, the connection substrate 4 or the termination substrate 5 is accommodated within a case 10 and forms an optical modulator module.

For reference, an example of the optical modulator module using the connection substrate is disclosed in Patent Document 1.

[Patent Document 1] JP-A-2003-233043

A method of operating an optical modulator will be described. A microwave signal generated from a modulation signal source 6 is introduced into a GPO connector 7 corresponding to an input terminal of a case 10 and is transmitted form the associated connector to a signal input terminal 11 of a connection substrate 4 as shown in FIG. 1B.

In the connection substrate 4, the microwave signal is output to a signal output terminal 12 through an amplifier 8 or a functional element (not shown) for converting the microwave signal into various states.

Wire bonding is done between the signal output terminal 12 of the connection substrate and an electrode pad of the signal electrode 2 of an optical modulation element. The microwave signal output from the connection substrate 4 is continuously transmitted to the signal electrode 2. According to the microwave signal transmitted to the signal electrode 2, the optical wave propagating within the optical waveguide of the optical modulation element is optically modulated.

An additional electrode pad is provided on a terminal of the signal electrode 2. Similarly, wire bonding is done between the electrode pad and a signal introduction terminal 14 of the termination substrate as shown in FIG. 1C. Thus, the microwave signal is additionally transmitted from the signal electrode 2 to the termination substrate 5, and is absorbed by a termination device 9 provided within the termination substrate.

However, the inventors have found that a radiation mode 13 of a microwave is generated from a microwave signal input to the signal input terminal 11 in the connection substrate 4 as shown in FIG. 1B and the radiation mode 13 propagates through the connection substrate and is recombined with the microwave signal propagating through a signal line in the signal output terminal 12. The recombined radiation mode serves as noise in a modulation signal. This noise propagates through the signal electrode 2 of the optical modulation element, thereby degrading modulation properties of the optical modulator.

In the termination substrate 5 as shown in FIG. 1C, part of a microwave signal introduced into the termination device 9 is reflected by the termination device and generates a radiation mode 15 of the microwave. The radiation mode 15 is recombined with the signal introduction terminal 14 of the signal propagating through the termination substrate, and is propagated to the signal electrode 2, so that the microwave travels in a direction reverse to the conventional propagation direction. This radiation mode 15 also serves as noise in a modulation signal.

In the connection substrate 4, a radiation mode (not shown) of the microwave reflected by the signal output terminal 12 is generated. The microwave propagating through the signal electrode 2 in the reverse direction generates a radiation mode (not shown) in the signal output terminal 12. These radiation modes are recombined with the signal input terminal 11 of the signal propagating through the connection substrate and flow backward to the modulation signal source 6, thereby causing the operation of the optical signal source to be unstable.

DISCLOSURE OF THE INVENTION

Problems to be Solved by the Invention

The invention has been made to solve the above-mentioned problems, and it is an object of the invention to provide an optical modulator that suppresses a radiation mode of a microwave generated in a connection substrate or a termination substrate from entering a signal electrode of the optical modulator and suppresses modulation properties from being degraded.

Means for Solving the Problems

According to a first aspect of the invention, an optical modulator includes an optical modulation element having a substrate with an electro-optic effect, an optical waveguide formed on the substrate, and a modulating electrode for modulating light passing through the optical waveguide; and a connection substrate, arranged outside the substrate, for supplying the optical modulation element with a microwave signal operating the optical modulation element, wherein a signal input terminal and a signal output terminal are formed on the connection substrate, and a recombination suppression unit that suppresses a radiation mode of the microwave signal input to the signal input terminal from being recombined with the signal output terminal is provided on the connection substrate.

According to a second aspect of the invention, in the optical modulator according to the first aspect, the recombination suppression unit is arranged so that the signal output terminal is not located on a path through which the radiation mode of the microwave signal propagates.

According to a third aspect of the invention, in the optical modulator according to the first aspect, the recombination suppression unit is formed around the signal output terminal and is a unit that shields the radiation mode of the microwave signal or discharges the radiation mode of the microwave signal outside the connection substrate.

According to a fourth aspect of the invention, in the optical modulator according to any one of the first to third aspects, a functional element for converting the microwave signal into various states is arranged on the connection substrate.

In the invention, "the functional element for converting the microwave signal into various states" is arranged on the connection substrate, and refers to an electrical circuit element having a function for converting a microwave signal state into a specific state in signal amplification/attenuation, phase adjustment, signal division or combination, or the like according to the microwave signal.

According to a fifth aspect of the invention, an optical modulator includes an optical modulation element having a substrate with an electro-optic effect, an optical waveguide formed on the substrate, and a modulating electrode for modulating light passing through the optical waveguide; and a termination substrate, arranged outside the substrate, for supplying a microwave signal operating the optical modulation element from the optical modulation element to a termination device, wherein a signal introduction terminal and a termination device are formed to the termination substrate, and a recombination suppression unit that suppresses a radiation mode of the microwave signal reflected from the termination device from being recombined with the signal introduction terminal is provided on the termination substrate.

According to a sixth aspect of the invention, in the optical modulator according to the fifth aspect, the recombination suppression unit is arranged so that the signal introduction terminal is not located on a path through which the radiation mode of the reflected microwave signal propagates.

According to a seventh aspect of the invention, in the optical modulator according to the fifth aspect, the recombination suppression unit is formed around a signal output terminal and is a unit that shields the radiation mode of the reflected microwave signal or discharges the radiation mode of the reflected microwave signal outside the termination substrate.

EFFECTS OF THE INVENTION

According to a first aspect of the invention, since an optical modulator includes an optical modulation element having a substrate with an electro-optic effect, an optical waveguide formed on the substrate, and a modulating electrode for modulating light passing through the optical waveguide; and a connection substrate, arranged outside the substrate, for supplying the optical modulation element with a microwave signal operating the optical modulation element, wherein a signal input terminal and a signal output terminal are formed on the connection substrate, and a recombination suppression unit that suppresses a radiation mode of the microwave signal input to the signal input terminal from being recombined with the signal output terminal is provided on the connection substrate, a defect in which the radiation mode is recombined with the signal output terminal and enters a signal electrode can be suppressed and the degradation of modulation properties due to the radiation mode of the microwave can be suppressed.

According to a second aspect of the invention, since the recombination suppression unit is arranged so that the signal output terminal is not located on a path through which the radiation mode of the microwave signal propagates, a defect due to the radiation mode can be effectively addressed in a simple and convenient configuration in which an arrangement of the signal input terminal generating the radiation mode and the signal output terminal recombined with the radiation mode is adjusted.

According to a third aspect of the invention, since the recombination suppression unit is formed around the signal output terminal and is a unit that shields the radiation mode of the microwave signal or discharges the radiation mode of the microwave signal outside the connection substrate, a recombination of the radiation mode with the signal output terminal can be effectively suppressed by forming the shielding or discharging unit to the connection substrate.

According to a fourth aspect of the invention, since a functional element for converting the microwave signal into various states is arranged on the connection substrate, a defect due to the radiation mode can be addressed also in various connection substrates.

According to a fifth aspect of the invention, since an optical modulator includes an optical modulation element having a substrate with an electro-optic effect, an optical waveguide formed on the substrate, and a modulating electrode for modulating light passing through the optical waveguide; and a termination substrate, arranged outside the substrate, for supplying a microwave signal operating the optical modulation element from the optical modulation element to a termination device, wherein a signal introduction terminal and a termination device are formed to the termination substrate, and a recombination suppression unit that suppresses a radiation mode of the microwave signal reflected from the termination device from being recombined with the signal introduction terminal is provided on the termination substrate, a defect in which the radiation mode of the microwave signal reflected from the termination device is recombined with the signal introduction terminal and enters a signal electrode can be suppressed and the degradation of modulation properties due to the radiation mode of the microwave can be suppressed.

According to a sixth aspect of the invention, since the recombination suppression unit is arranged so that the signal introduction terminal is not located on a path through which the radiation mode of the reflected microwave signal propagates, a defect due to the radiation mode can be effectively addressed in a simple and convenient configuration in which an arrangement of the termination device and the signal introduction terminal is adjusted.

According to a seventh aspect of the invention, since the recombination suppression unit is formed around a signal output terminal and is a unit that shields the radiation mode of the reflected microwave signal or discharges the radiation mode of the reflected microwave signal outside the termination substrate, a recombination of the radiation mode with the signal introduction terminal can be effectively suppressed.

BRIEF DESCRIPTION OF THE DRAWINGS

FIG. 1 is a schematic diagram of a conventional optical modulator.

FIG. 2 is a schematic diagram of an optical modulator in accordance with the invention.

FIG. 3 is a diagram showing examples in which a plurality of signal input terminals or a plurality of signal output terminals are provided in the optical modulator in accordance with the invention.

FIG. 4 is a diagram showing examples of using a shielding body in the optical modulator in accordance with the invention.

FIG. 5 is a diagram showing examples of using a radiation mode discharging unit in the optical modulator in accordance with the invention.

FIG. 6 is a diagram showing examples of using a through hole as the radiation mode discharging unit in the optical modulator in accordance with the invention.

REFERENCE NUMERALS

1: OPTICAL MODULATION ELEMENT
2: SIGNAL ELECTRODE
3: OPTICAL FIBER
4, 20, 30, 40, 50, 60, 70: CONNECTION SUBSTRATE
5, 21: TERMINATION SUBSTRATE
6: MODULATION SIGNAL SOURCE
7: CONNECTOR
8, 52, 63, 72: AMPLIFIER
9: TERMINATION DEVICE
10: CASE
11, 22, 31, 41, 42, 51, 61, 71: SIGNAL INPUT TERMINAL
12, 23, 33, 34, 44, 45, 54, 65, 74: SIGNAL OUTPUT TERMINAL
13, 15, 24, 26, 35, 46, 47, 56, 67, 76: MICROWAVE RADIATION MODE
14, 25: SIGNAL INTRODUCTION TERMINAL
53, 62, 64, 73: SIGNAL LINE
55: SHIELDING BODY
66: CAVITY (CONCAVE PORTION)
75: THROUGH HOLE

BEST MODE FOR CARRYING OUT THE INVENTION

Hereinafter, exemplary embodiments of the invention will be described.

FIG. 2 is a schematic diagram of an optical modulator in accordance with the invention.

In FIG. 2, portions having the same reference numerals as those of FIG. 1 have configurations similar thereto. In the invention, if a substrate having an electro-optic effect, an optical waveguide formed onto the substrate, and a modulating electrode for modulating light passing through the optical waveguide are provided for an optical modulation element 1, they are not specifically limited in terms of materials or other structures. For example, the substrate having the electro-optic effect can use lithium niobate, lithium tantalate, Lead Lanthanum Zirconate Titanate (PLZT), and a quartz-based material. The optical waveguide of the substrate can be formed by diffusing Ti or the like on the substrate surface in a thermal diffusion method, a proton exchange method, or the like. A signal electrode or a ground electrode constructing the modulating electrode can be formed by an electrode pattern of Ti/Au and can be formed by a gold plating method or the like.

If needed, a buffer layer of a dielectric substance of $SiO_2$ or the like can be provided on the substrate surface after the optical waveguide is formed.

A feature of the invention shown in FIG. 2 is that a microwave radiation mode can be effectively suppressed from being recombined with a signal line by adjusting an arrangement of the input and output terminals and the like within the substrate as shown in FIG. 2(b) or 2(c) in a connection substrate 20 and a termination substrate 21.

In the connection substrate 20, a radiation mode 24 of the microwave signal generated from a signal input terminal 22 is radiated at an angle of more than about one degree with respect to the signal line and almost propagates through the connection substrate in a direction as indicated by a dashed dotted line A. Thus, the radiation mode 24 can be suppressed from being recombined with a signal output portion 23 by arranging a signal output portion 23 in a position away from the dashed dotted line A.

Similarly, in the termination substrate 21, a radiation mode 26 of the microwave-reflected from a termination device 9 almost propagates through the termination substrate in a direction as indicated by a dashed dotted line B. Thus, the radiation mode 26 can be suppressed from being recombined with a signal introduction terminal 25 by arranging the signal introduction terminal 25 away from the dashed dotted line B.

By adopting the configuration as shown in FIG. 2(b) also for a radiation mode (not shown) of the microwave generated from the signal output terminal 23 as described above in the connection substrate 20, the radiation mode can be suppressed from being recombined with the signal input terminal 22 and the influence to a modulation signal source can be mitigated.

In FIG. 2, an example is shown in which one signal input terminal 22 and one signal output terminal 23 are located in the connection substrate 20, but the optical modulator according to the invention is not limited thereto. For example, a plurality of signal output terminals can be included in a connection substrate 30 as shown in FIG. 3(a). Alternatively, a plurality of signal input terminals and a plurality of signal output terminals can be included in a connection substrate 40 as shown in FIG. 3(b).

In the case of FIG. 3(a), signal output terminals 33 and 34 are arranged in positions away from a propagation direction (as indicated by a dashed dotted line C) for a radiation mode 35 of a microwave signal radiated from a signal input terminal 31.

By arranging signal output terminals 44 and 45 in positions away from dashed dotted lines D and E for a radiation mode 46 of a microwave signal radiated from a signal input terminal 41 and a radiation mode 47 of a microwave signal radiated from another signal input terminal 42 in the case of FIG. 3(b) the radiation modes can be suppressed from being recombined with the signal output terminals. Reference numeral 43 refers to a compound functional element in which a combiner or divider and the like are combined.

The connection substrate has been described with reference to FIG. 3. Similarly, it is also possible to construct a termination substrate in which multiple signal introduction terminals or multiple termination devices are used.

In FIGS. 2 and 3, a method of adjusting an arrangement of the input and output terminals and the like has been illustrated as a recombination suppression unit for suppressing a recombination of the microwave radiation mode, but the invention is not limited thereto. As shown in FIG. 4 or 5, there can be used a unit for shielding the microwave radiation mode or discharging the microwave radiation mode outside the termination substrate.

FIG. 4 shows examples of a connection substrate 50 having an amplifier 52. A configuration is made so that a radiation mode 56 of a microwave radiated from a signal input terminal 51 is shielded using a shielding body 55 and is not incident into a signal output portion 54. FIG. 4(b) shows a sectional view taken along a dashed dotted line F of FIG. 4(a). Reference numeral 53 refers to a signal line.

Preferably, a low dielectric loss material such as aluminum, oxide aluminum, or the like can be used as a substrate material constructing a connection substrate or a termination substrate. Preferably, a conductive metal material such as Au, Al, or the like can be used as the shielding body.

A method of assembling the shielding body in a substrate can adopt a method of forming a concave portion to the substrate in a cutting process or the like, a method of inserting a small piece made of a shielding material into the concave portion, or the like.

FIG. 5 shows examples of a connection substrate 60 having an amplifier 63. A configuration is made so that a radiation mode 67 of a microwave radiated from a signal input terminal 61 is discharged outside the connection substrate 60 using a cavity (or concave portion) 66 and is not incident into a signal output portion 65. FIG. 5(b) shows a sectional view taken along a dashed dotted line G of FIG. 5(a). Reference numerals 62 and 64 refer to signal lines.

As shown in FIG. 6, a radiation mode 76 of a microwave radiated from a signal input terminal 71 can be discharged outside a connection substrate 70 using a through hole 75 passing through the connection substrate 70 in the connection substrate 70 having an amplifier 72. This configuration is made so that the radiation mode 76 of the microwave is not incident into a signal output portion 74. FIG. 6(b) shows a sectional view taken along a dashed dotted line H of FIG. 6(a). Reference numeral 73 refers to a signal line.

The technique of shielding or discharging the radiation mode as shown in FIGS. 4 to 6 can be applied to a connection substrate or a termination substrate having other functional elements. If needed, various types of techniques as described above can be also combined and used.

INDUSTRIAL APPLICABILITY

According to the invention as described above, an optical modulator can be provided which suppresses a radiation mode of a microwave generated in a connection substrate or a termination substrate from entering a signal electrode of the optical modulator and suppresses modulation properties from being degraded.

The invention claimed is:

1. An optical modulator comprising:
an optical modulation element having a substrate with an electro-optic effect; an optical waveguide formed on the substrate, and a modulating electrode for modulating light passing through the optical waveguide; and
a termination substrate, arranged outside the substrate, for supplying a microwave signal operating the optical modulation element from the optical modulation element to a termination device,
wherein a signal introduction terminal and a the termination device are formed on the termination substrate, and
a recombination suppression unit is provided on the termination substrate, and said recombination suppression unit suppresses a radiation mode of a microwave signal reflected from the termination device from being recombined with the signal introduction terminal.

2. The optical modulator according to claim 1, wherein the recombination suppression unit is arranged so that the signal introduction terminal is not located on a path through which the radiation mode of the reflected microwave signal propagates.

3. The optical modulator according to claim 1, wherein the recombination suppression unit is formed around a signal output terminal and is a unit that shields the radiation mode of the reflected microwave signal.

4. The optical modulator according to claim 1, wherein the recombination suppression unit is formed around a signal output terminal and is a unit that discharges the radiation mode of the reflected microwave signal outside the termination substrate.

* * * * *